(12) United States Patent
Liu

(10) Patent No.: US 7,078,834 B2
(45) Date of Patent: Jul. 18, 2006

(54) ROTOR DEVICE CAPABLE OF DISSIPATING HEAT

(75) Inventor: Wen-Hao Liu, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/001,113

(22) Filed: Dec. 2, 2004

(65) Prior Publication Data

US 2006/0119195 A1    Jun. 8, 2006

(51) Int. Cl.
    *H02K 1/32* (2006.01)
(52) U.S. Cl. .............................. 310/64; 310/52; 417/368
(58) Field of Classification Search .................. 310/52, 310/54, 58, 62, 64; 417/368, 423.8
    See application file for complete search history.

(56) References Cited

U.S. PATENT DOCUMENTS

| 6,750,578 B1 * | 6/2004 | Buening et al. ............... 310/89 |
| 6,773,239 B1 * | 8/2004 | Huang et al. ................ 417/354 |
| 6,815,849 B1 * | 11/2004 | Serizawa et al. ............. 310/62 |

* cited by examiner

*Primary Examiner*—Darren Schuberg
*Assistant Examiner*—Nguyen Hanh

(57) ABSTRACT

A rotor capable of dissipating heat comprises a hub and a shielding received in the hub. The shielding case has an upper wall with a plurality of projection parts. The projection parts have a side thereof attached to the upper wall respectively and a plurality of openings are disposed in the upper wall at the projection parts. The hub has an upper hub wall with a plurality of through holes. The fluid can move in and out via the openings and the trough holes to perform heat dissipation.

6 Claims, 8 Drawing Sheets

ROTOR DEVICE CAPABLE OF DISSIPATING HEAT

BACKGROUND OF THE INVENTION

1. Field of the Invention

The present invention is related to a rotor device capable of dissipating heat and particularly to a rotor assembly, which can remove heat generated from running of the rotor.

2. Brief Description of the Related Art

Referring to FIG. 1, a conventional rotor assembly of a fan motor includes a fan frame 11 and a hub 12. The fan frame 11 provides a support base 111 with a collar bush 112. A bearing 113 is received in the collar bush 112 and a stator 13 is disposed to surround and fit with the collar bush 112 such that the stator 13 can be attached to the support base 111. The hub 12 has main wall and a circumferential wall such that a space can be defined to receive a shield member 14. The shield member 14 also has a main wall and a circumferential wall to define a space for receive a rotor 15. A plurality of fan blades 121 are radially disposed outside the hub 12 and a spindle 16 is joined to the hub 12 and the shield member 14 at an end thereof and passes through the bearing 113 to allow the hub 12 and the shield member 14 being movably attached to the support base 111.

When the stator 13 and the rotor 15 of the fan motor are magnetized to drive the hub 12 and the shield member 14 rotating due to change of phase, the fan blades thus rotates to move fluid and performs heat dissipation to the hot objects. However, the problem of conventional rotor assembly resides in that heat can be generated from running of the stator 13 and the rotor 15 and most of the heat stays in the hub without removing because of the shield member being enclosed in the hub with poor heat transfer. In this way, a great deal of heat stays in the hub to lead shortened life span of the motor and to increase heat in the system.

SUMMARY OF THE INVENTION

An object of the present invention is to provide a rotor device capable of dissipating heat in which the hub has though holes and the shield member has openings for the fluid moving in and out for attaining purposed of heat dissipation.

Another object of the present invention is to provide a rotor device capable of dissipating heat in which the through holes of the hub and the openings of the shield member are arranged to offset to each other for preventing from foreign substances falling into the device via through holes and the openings.

A rotor device capable of dissipating heat comprises a shielding case and a hub mounted on the shielding case. The shielding case further comprises an upper wall, providing a plurality of openings spacing apart from each other and each of the openings at a lateral side thereof being attached with a projection part respectively and a circumferential wall, being joined to the periphery of the upper wall. The hub further comprises an upper hub wall, providing a plurality of through holes corresponding to the openings and a shoulder wall, being joined to the upper hub wall. Fluid can move in and out via the openings of the shielding case and the through holes of the hub. Hence, the fluid in the rotor device of the present invention performs convection to achieve purpose of heat dissipation.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
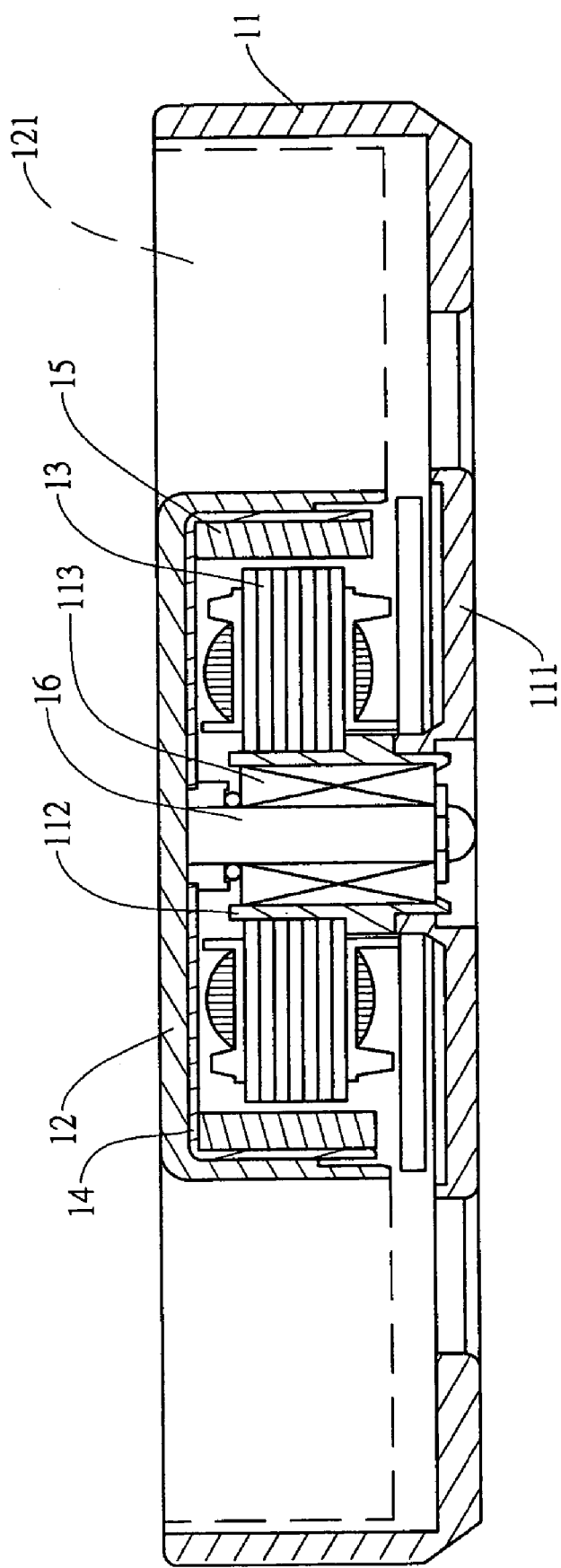
FIG. 1 is a sectional view of the conventional fan rotor device.
Figure 2:
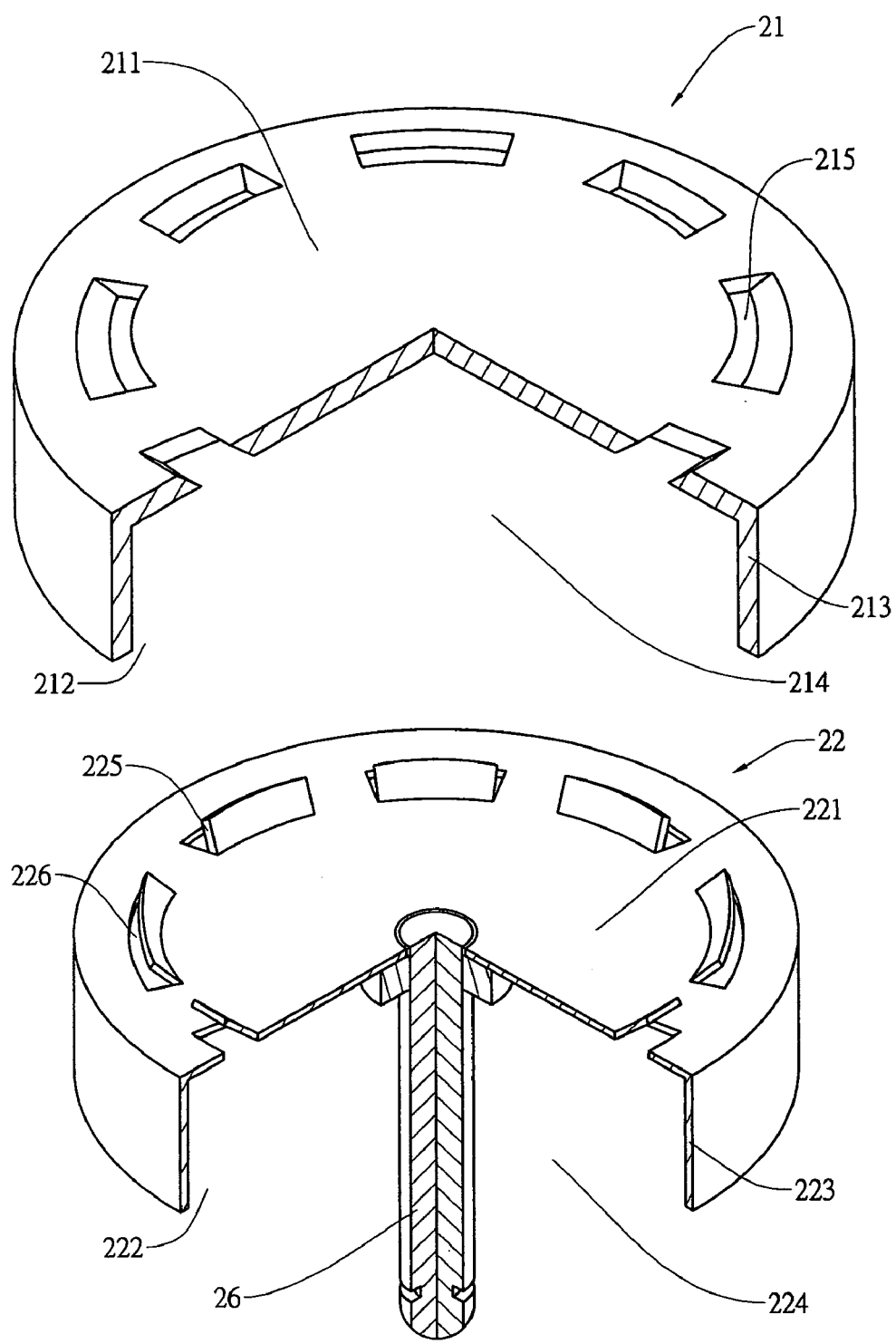
FIG. 2 is an exploded perspective sectional view of the first preferred embodiment of a rotor device capable of dissipating heat according to the present invention.
Figure 3:
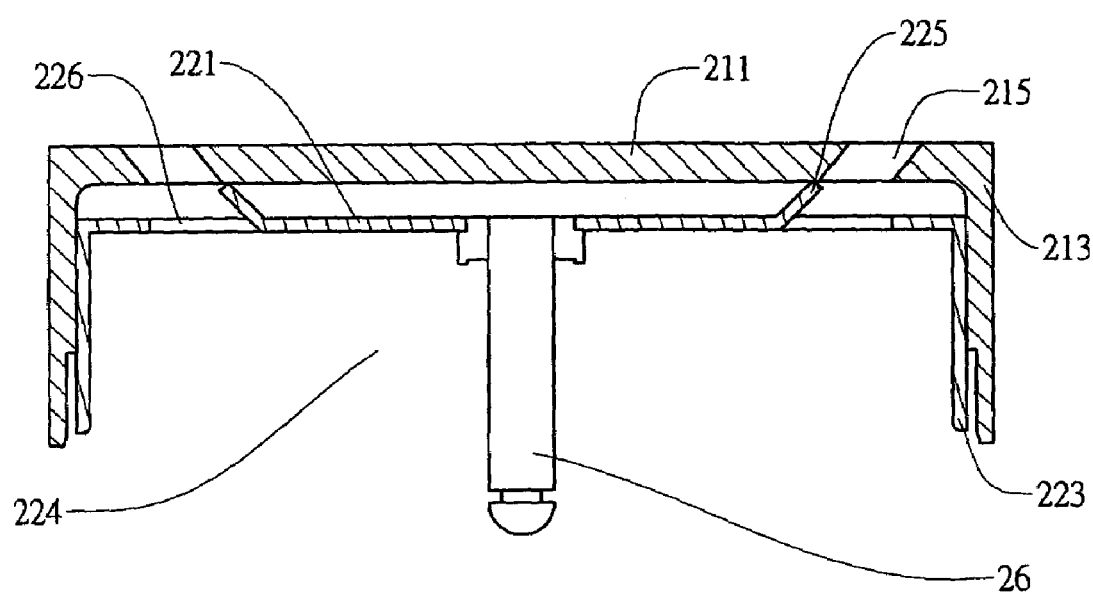
FIG. 3 is an assembled sectional view of FIG. 2.

Referring to FIGS. 2 and 3, the first embodiment of a rotor device capable of dissipating heat according to the present invention is illustrated. The rotor device in the first embodiment comprises a hub 21 and a shielding case 22. The shielding case 22 has an upper wall 221 and a circumferential wall 223 being joined to the upper wall 221. The open side 222 of the shielding case 22 provides a chamber 224, which is confined with the upper wall 221 and the circumferential wall 223. The upper wall 221 provides a plurality of curve late shaped slant projection parts 225, which are equidistantly disposed near periphery of the shielding case 22 circumferentially, with a side thereof being attached to the upper wall 221 respectively. The upper wall 221 further provides a plurality of elongated curve openings 226 corresponding to the projection parts 225 respectively with a circumferential side of each opening 226 coinciding the side of each projection part 225 attached to the upper wall 221 respectively. A spindle 26 is attached to the center of the upper wall 211. The hub 21 has an upper hub wall 211 and a circumferential shoulder wall 213 with an open end 212. A hub chamber 214 is confined with the upper hub wall 211 and the shoulder wall 213 to receive the shielding case 22 so that the upper hub wall 211 and the shoulder wall 213 can be disposed at outer sides of the upper wall 221 and the circumferential wall 223 of the shielding case 22. The upper hub wall 211 has a plurality of elongated curve through holes 215 being circumferentially disposed corresponding to the slant projection parts 225 and the curve openings 226 with two opposite circumferential walls of each through hole 215 slanting along an inclining angle as each slant projection part 225 does.

Wherein, the hub 21 and the shielding case 22 can be joined to each other firmly with adhesives and the through hole 215 is disposed right on top of and corresponding to the openings 226.

Figure 4:
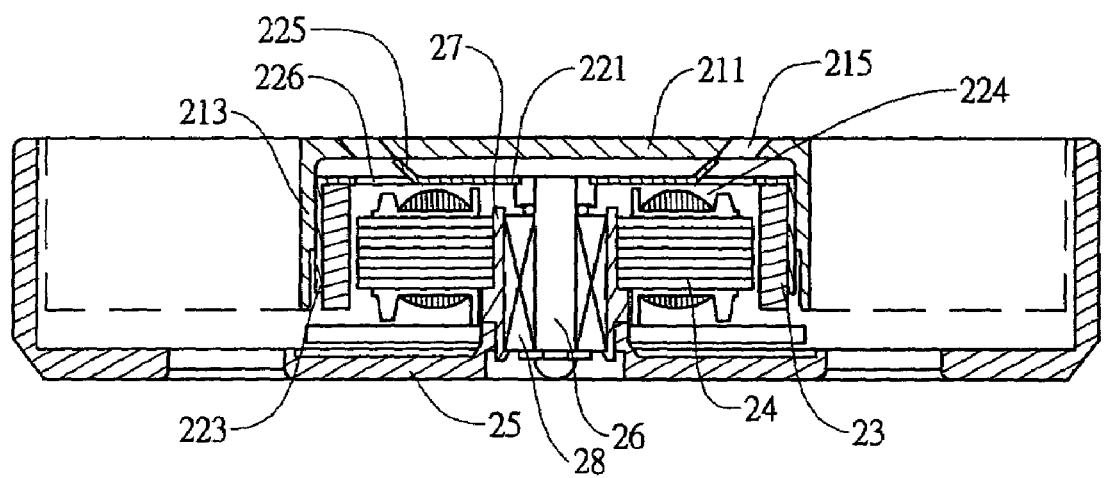
FIG. 4 is a sectional view illustrating the first embodiment of the present invention applied to a fan motor.

Referring to FIG. 4 in company with FIG. 2, it can been seen that the motor rotor 23 is disposed at the inner side of the circumferential wall 223 of the shielding case 22 and the motor stator 24 is attached to a base 25. The base 25 provides a bearing barrel seat 27 to fit with a bearing 28 and the spindle 26 passes through the bearing 28 such that the hub 21 and the shielding case 22 can be movably attached to the base 25 so as to constitute magnetic connection between the motor stator 24 and the motor rotor 23. When the motor stator 24 and the motor rotor 23 are magnetized to rotate the hub 21 and shielding case 22, fluid is dragged to move centrifugally and rotational movement of the stator 22 with rotor 23 resulting from magnetic force produces heat to cause temperature of the fluid in the chamber 224 of the shielding case 22 rising. As a result, pressure of the fluid along the lateral direction becomes greater, that is, density of the fluid at the inner side of the shielding case 22 increases and it leads the fluid to move toward the openings 226 of the shielding case 22. When the fluid flows centrifugally to pass through the openings 226, the slant projection parts 225 and the slant through holes 215 guide the fluid moving outward rapidly and heat exchange can be performed at the same time to decrease heat generated by the motor rotor 23 and the motor stator 24 for enhancing heat dissipation efficiency and prolonging life span of the motor.

Figure 5:
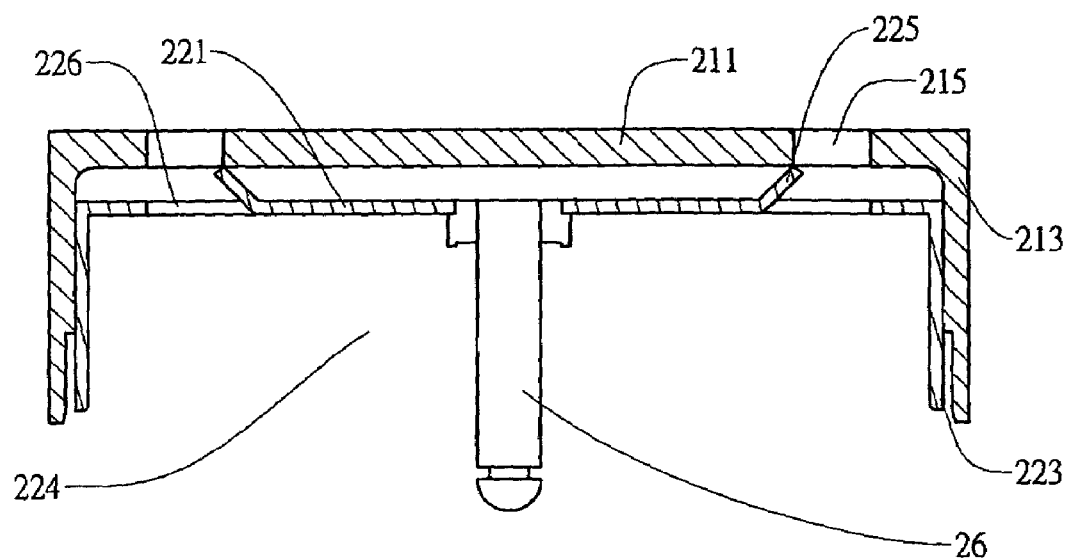
FIG. 5 is a sectional view illustrating the hub in the first embodiment of the present invention providing another type of through holes thereof.

Referring to FIG. 5, the through holes 215 in the hub 21 can provide non-slant inner walls for the fluid passing through and the heat dissipation efficiency can be enhanced as well.

Figure 6:
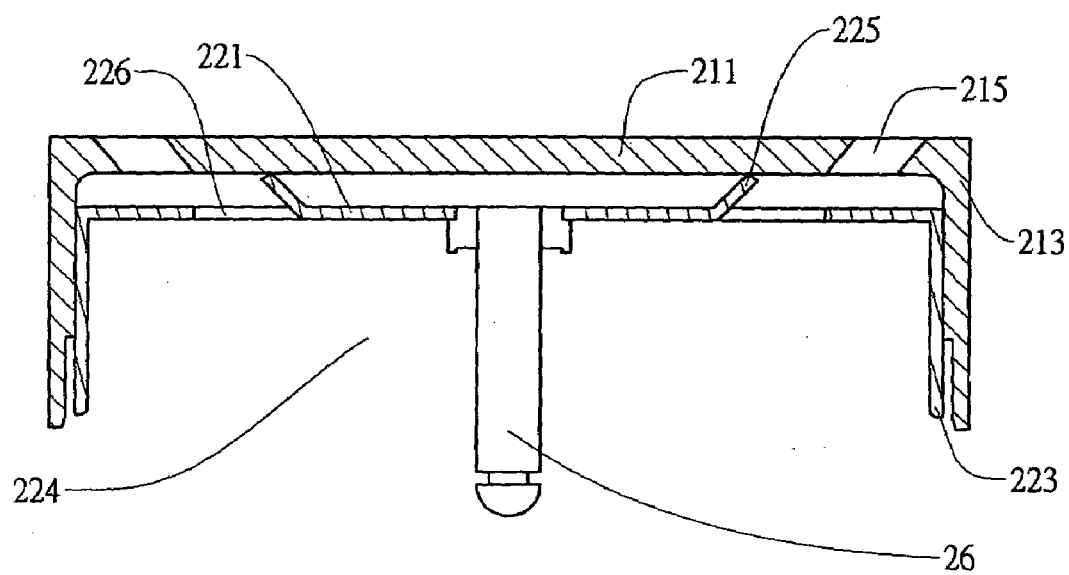
FIG. 6 is a sectional view illustrating slant openings corresponding to the through holes in the hub of the first embodiment of the present invention.

Referring to FIG. 6, the openings 226 of the shielding case 21 can be arranged being farther from the periphery of the shielding case 21 and the through holes 215 of the hub 21 in the first embodiment can be arranged being close to the periphery of the hub such that the openings 226 and the through holes 215 misalign from each other to allow the fluid with larger lateral pressure obtaining better heat convection during moving outward. In this way, heat generated by the rotor 23 and the stator 24 can be reduced for promoting heat dissipation efficiency and prolonging life span of the motor. Meanwhile, it can prevent from foreign substances falling down to the chamber 224 of the shielding case 22 via the through holes 215 and the openings 226 and it is favorable for running of the rotor 23 and the stator 24.

Figure 7:
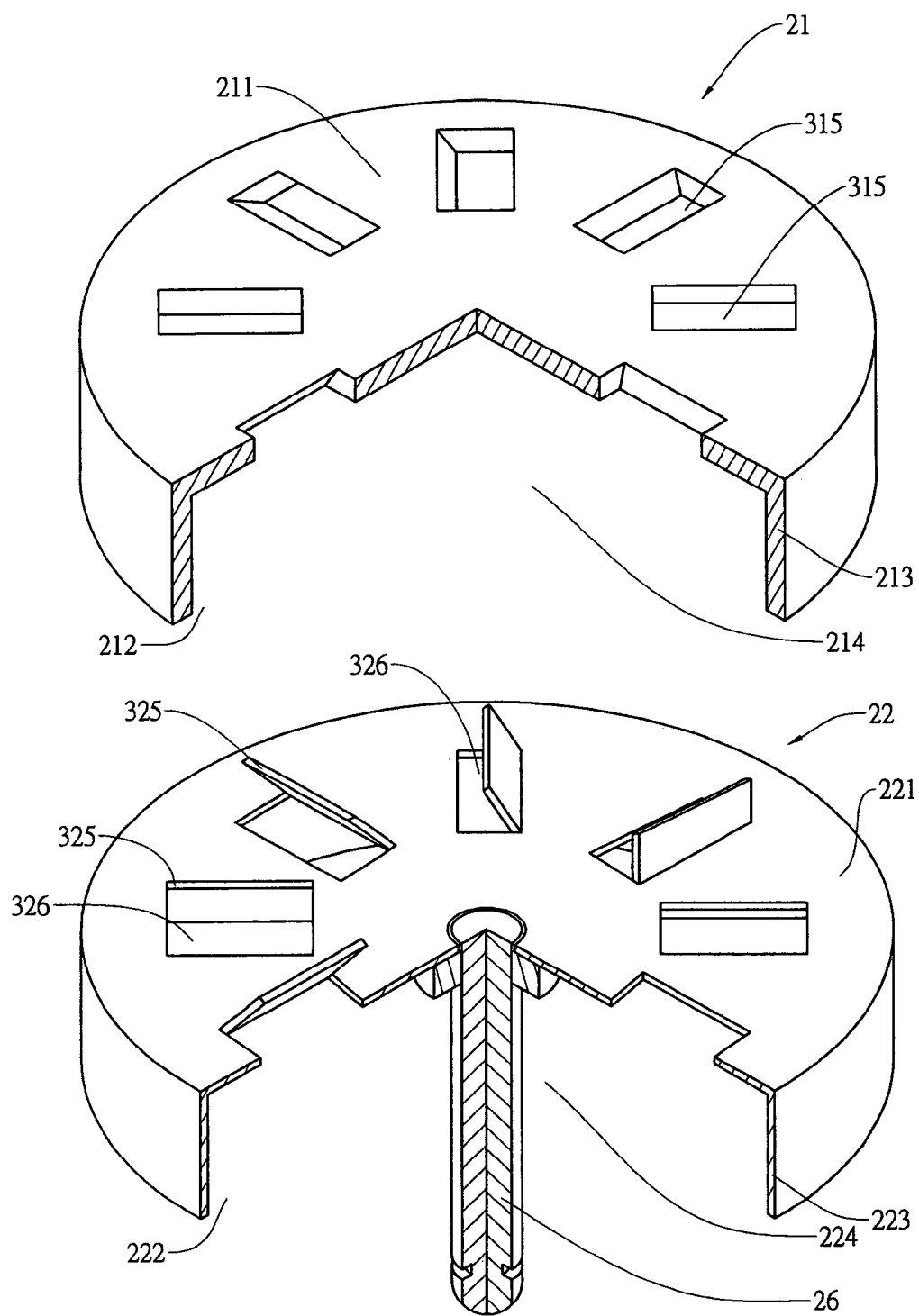
FIG. 7 is a partial sectional perspective view of the second embodiment of a rotor device capable of dissipating heat according to the present invention.
Figure 8:
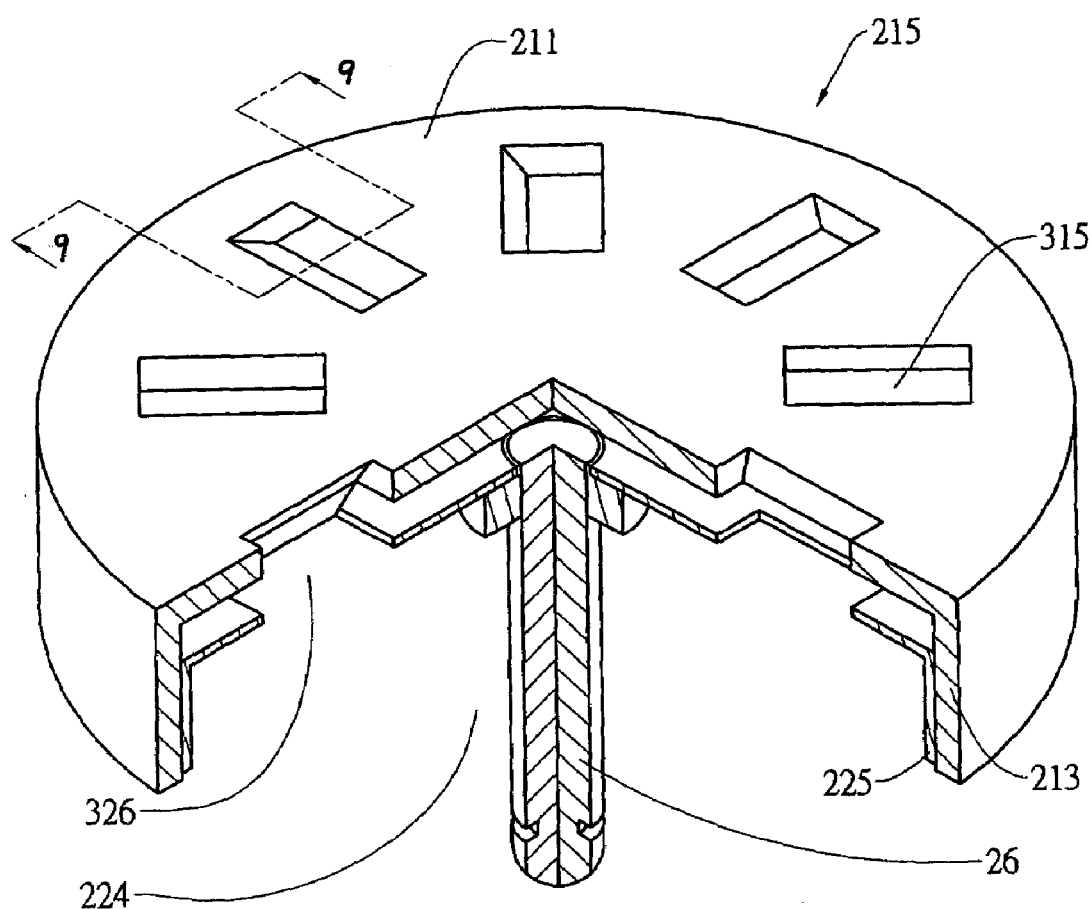
FIG. 8 is a partial sectional assembled perspective view of the second embodiment of a rotor device capable of dissipating heat according to the present invention.
Figure 9:
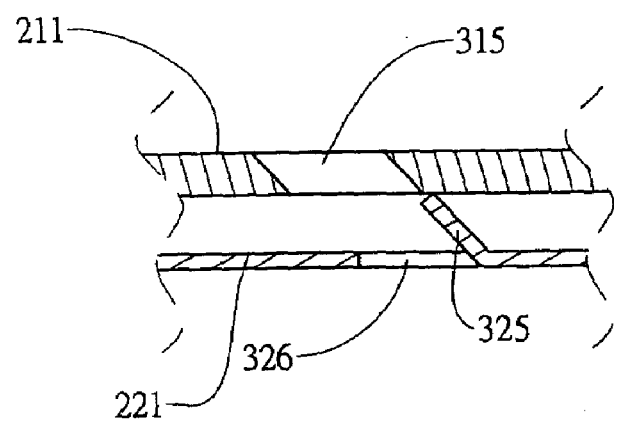
FIG. 9 is a sectional view along line 9—9 shown in FIG. 8.

Referring to FIGS. 7 to 9, the second embodiment of the present invention is illustrated. The entire structure and function of the second embodiment is about the same as the first embodiment so that the identical parts and reference numbers will not be described further in detail. The difference of the second embodiment is in that the through holes 315 and the openings 326 with the projection parts 325 are radially disposed at the upper hub wall 211 of the hub 21 and the upper wall 221 of the shielding case 22 respectively as shown in FIGS. 7 and 8 in a way of the though holes 315 aligning with the openings 326 respectively as shown in FIG. 9.

Figure 10:
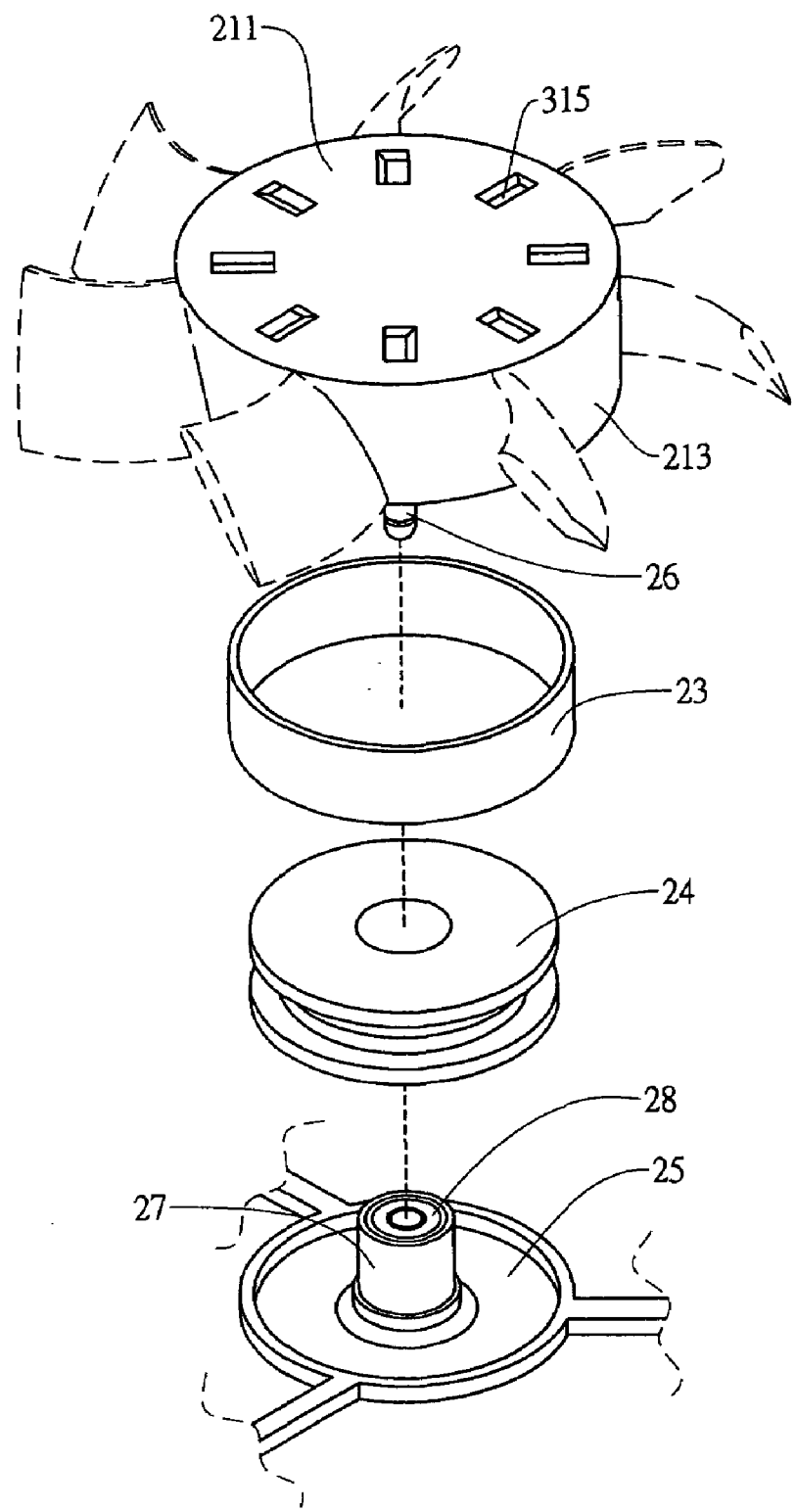
FIG. 10 is a disassembled perspective view illustrating the second embodiment of the present invention being applied to a fan motor.
Figure 11:
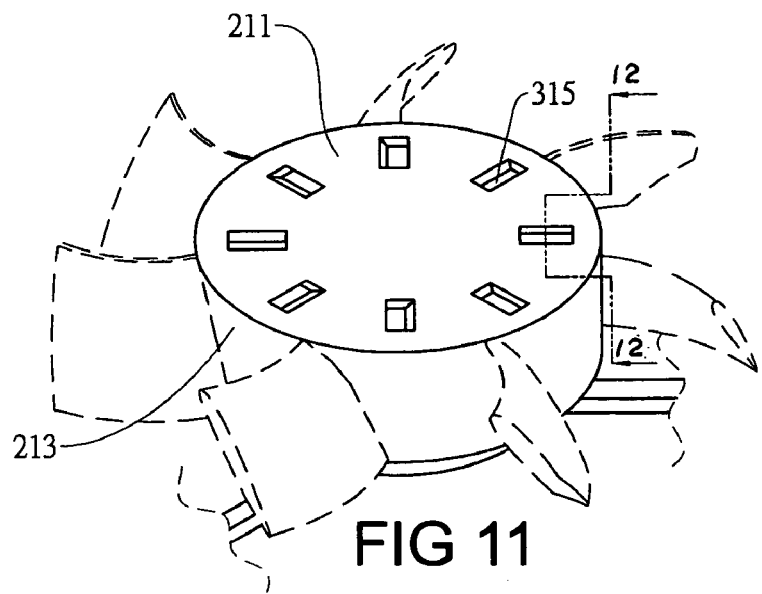
FIG. 11 is an assembled perspective view illustrating the second embodiment of the present invention being applied to a fan motor.
Figure 12:
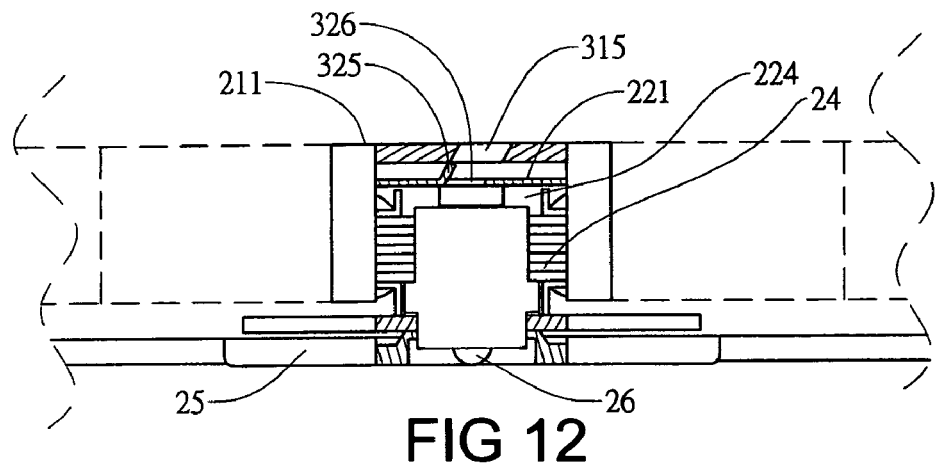
FIG. 12 is a sectional view along line 12—12 shown in FIG. 11.

Referring to FIGS. 10, 11 and 12 in company with FIG. 7 again, it can be seen that the rotor 23 of the fan motor is mounted in the shielding case 22 and the stator 24 thereof is attached to a base 25. The base 25 provides a bearing barrel seat 27 to fit with a bearing 28 and the spindle 26 passes through the bearing 28 such that the hub 21 and the shielding case 22 can be movably attached to the base 25 so as to constitute magnetic connection between the stator 24 and the rotor 23. When the stator 24 and the rotor 23 are magnetized to rotate the hub 21 and shielding case 22, the fluid is dragged to move centrifugally and rotational movements of the stator 22 and rotor 23 resulting from magnetic force produces heat to cause temperature of the fluid in the chamber 224 of the shielding case 22 rising. As a result, pressure of the fluid along the lateral direction becomes greater, that is, the density of the fluid at the inner side of the shielding case 22 increases the density thereof and it leads the fluid to move toward the openings 326 of the shielding case 22. When the fluid flows centrifugally to pass through the openings 226, the slant projection parts 325 and the slant through holes 315 guide the fluid moving outward rapidly and heat exchange can be performed at the same time to decrease heat generated by the motor rotor 23 and the motor stator 24 for enhancing heat dissipation efficiency and prolonging life span of the motor.

Figure 13:
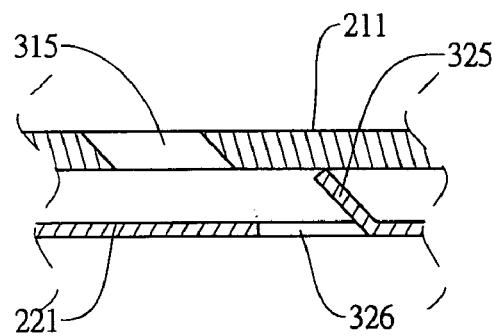
FIG. 13 is a sectional view illustrating slant openings corresponding to the through holes in the hub of the third embodiment of the present invention.

Referring to FIG. 13, the through holes 315 and the openings 226 can be arranged to provide positions thereof to be offset from each other as the preceding embodiment does instead of aligning with each other shown in FIG. 9 such that heat between the rotor 23 and the stator 24 can be reduced to promote heat dissipation efficiency and life span of the motor can be prolonged. In addition, it can prevent foreign substances from falling into the rotor device of the present invention.

Furthermore, the hub 21 and the shielding case 22 in the preceding two embodiments can be integrally made as a single unit instead of being made separately. Besides, the upper lateral sides of the projection parts 225, 325 and the edges of the openings 226, 326 can be provided either with a slant or without a slant.

While the invention has been described with referencing to preferred embodiments thereof, it is to be understood that modifications or variations may be easily made without departing from the spirit of this invention, which is defined by the appended claims.

What is claimed is:

1. A rotor device capable of dissipating heat, comprising:
   a shielding case with a first upper wall; and
   a hub with a second upper wall, being attached to the shielding case;
   wherein, the first upper wall provides a plurality of elongated openings being disposed equidistantly near the circumference thereof with a slant plate shaped projection part extending outward from a long lateral side of each of the openings to contact the inner side of the second upper wall and the second upper wall provides a plurality of elongated through holes corresponding to the openings.

2. The rotor device capable of dissipating heat as defined in claim 1, wherein each of the elongated openings and each of the elongated through holes provide two opposite long sides being circumferentially located respectively.

3. The rotor device capable of dissipating heat as defined in claim 1, wherein each of the elongated openings and each of the elongated through holes provide two opposite long sides being radially located respectively.

4. The rotor device capable of dissipating heat as defined in claim 2, wherein each of the elongated through holes provides a slant wall at the long sides thereof in parallel with the same slope as the projection part.

5. The rotor device capable of dissipating heat as defined in claim 1, wherein the through holes are disposed closed to the circumference of the second upper wall to misalign from the openings.

6. The rotor device capable of dissipating heat as defined in claim 3, wherein each of the elongated through holes provides a slant wall at the long sides thereof in parallel with the same slope as the projection part.

* * * * *